United States Patent [19]
Martin

[11] Patent Number: 5,132,690
[45] Date of Patent: Jul. 21, 1992

[54] LOW POWER POLYSTATIC RADAR METHOD AND SYSTEM

[75] Inventor: Raymond G. Martin, Ellicott City, Md.

[73] Assignee: Westinghouse Electric Corp., Pittsburgh, Pa.

[21] Appl. No.: 687,149

[22] Filed: Apr. 18, 1991

[51] Int. Cl.⁵ .............................................. G01S 13/00
[52] U.S. Cl. ..................................................... 342/158
[58] Field of Search .................................. 342/158, 371

[56] References Cited
U.S. PATENT DOCUMENTS

3,842,417  10/1974  Williams .............................. 342/158

Primary Examiner—Mark Hellner
Attorney, Agent, or Firm—W. G. Sutcliff

[57] ABSTRACT

Polystatic radar system and method for operating at relatively low power for a given coverage. The illumination power density of the transmit pattern is continuously varied as a function of the range to the receiver from each point within the receive beam coverage.

14 Claims, 7 Drawing Sheets

LOW POWER POLYSTATIC RADAR METHOD AND SYSTEM

DESCRIPTION

1. Technical Field

The present invention relates to polystatic radar; and more particularly, to a polystatic radar method and related system having relatively low power for a given coverage area.

2. Background Art

A polystatic radar system is one where one or more receivers are located some distance from one or more transmitters with separate antennas for each. One or more receivers and associated antennas are typically positioned to scan, either mechanically or by beam steering a defined area, which is referred to herein as the coverage area of the system. One or more transmitters transmit radar beams in a direction so that one or more of the receivers will detect reflections or echoes of the beam striking targets in the coverage area.

The transmitting of the radar beam to cause reflection by targets in the coverage area is referred to herein as illuminating or the illumination of the coverage area. Typically, this is accomplished by continuous illumination of the entire volume of the coverage area. This method has certain advantages because of its reliability in detecting targets and its simplicity in implementation. It also provides increased sensitivity of targets closer to the receivers than the maximum range of the coverage area.

However, the continuous or "floodlight" illumination of the coverage area necessitates relatively large transmit power requirements for the transmitter or transmitters of the polystatic system for a given coverage area. For example, the illumination of a coverage area for a single receiver having a maximum range of 35 kilometers with the transmitter located 74.5 kilometers from the receiver, for providing a required beamwidth of approximately 72°, would require an average transmit power of 18.4 kilowatts. This was predicated on a gain of 13.8 db, a two second search data rate, a high PRF of 50 kilohertz with two bursts per beamwidth in order to accomplish range ambiguity removal. The receiver antenna gain was assumed to be 38 db (6310 power ratio).

SUMMARY OF THE INVENTION

One of the objects of the present invention is to provide a method for operating and the related polystatic radar system that operates at a substantial reduction in power for a given coverage area.

Another object of the present invention is to provide a low power polystatic radar system and related method where the transmitter is located remote from the coverage area.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, there is provided a method of operating a polystatic radar system for detecting targets in a coverage area, comprising positioning at least one receiver with an associated receiving antenna within of the area to be covered; pointing the receiving antenna receiving beams through a selected range of angles for defining the coverage areas; positioning at least one transmitter with an associated phased array antenna remote from the coverage area; generating a transmit beam having an illumination power density that varies as a function of the range to the receiver from each point within the receive beam coverage; and synchronizing transmitted beam shape variations and scanning angles with the varying pointing angle of the receiving antenna.

According to another aspect of the invention, there is provided a polystatic radar system for detecting targets in a selected coverage area which comprises at least one transmitter including a transmitting phased array antenna for disposition remote from the selected coverage area, means for dynamically shaping the transmitted beam of the at least one antenna and steering the beam through a predetermined scanning angle of the coverage area. The shaping and steering means varying the illumination power density as a function of the range to the receiver from each point within the receiver beam coverage. At least one receiver includes an associated passive receiving antenna disposed for detecting targets in the coverage area; and means for synchronizing the scanning of the receiving antenna and transmitted beam.

Other objects and advantages of this invention will in part be realized from the specification, and in part realized from the drawings and from practice of the invention.

The accompanying drawings, which are incorporated in and constitute part of this specification, illustrate one embodiment of the invention and, together with the description, serve to explain the principles of the invention.

DESCRIPTION OF THE PREFERRED EMBODIMENT

The present invention is a system and method for the radar detection of airborne targets in a defined coverage area in azimuth and a selected angle in elevation. As an example, and referring to FIG. 1, a circular band 20, which is shown in perspective, illustrates the azimuth and elevation coverage of a possible polystatic radar system receiver 22 in the case of a mechanically rotating receive antenna. The height of band 20 represents the coverage in elevation and is shown as having an altitude of approximately ten kilometers, for example. The radius of band 20 is exemplified as being in a range of approximately 35 kilometers.

Figures 1, 3:
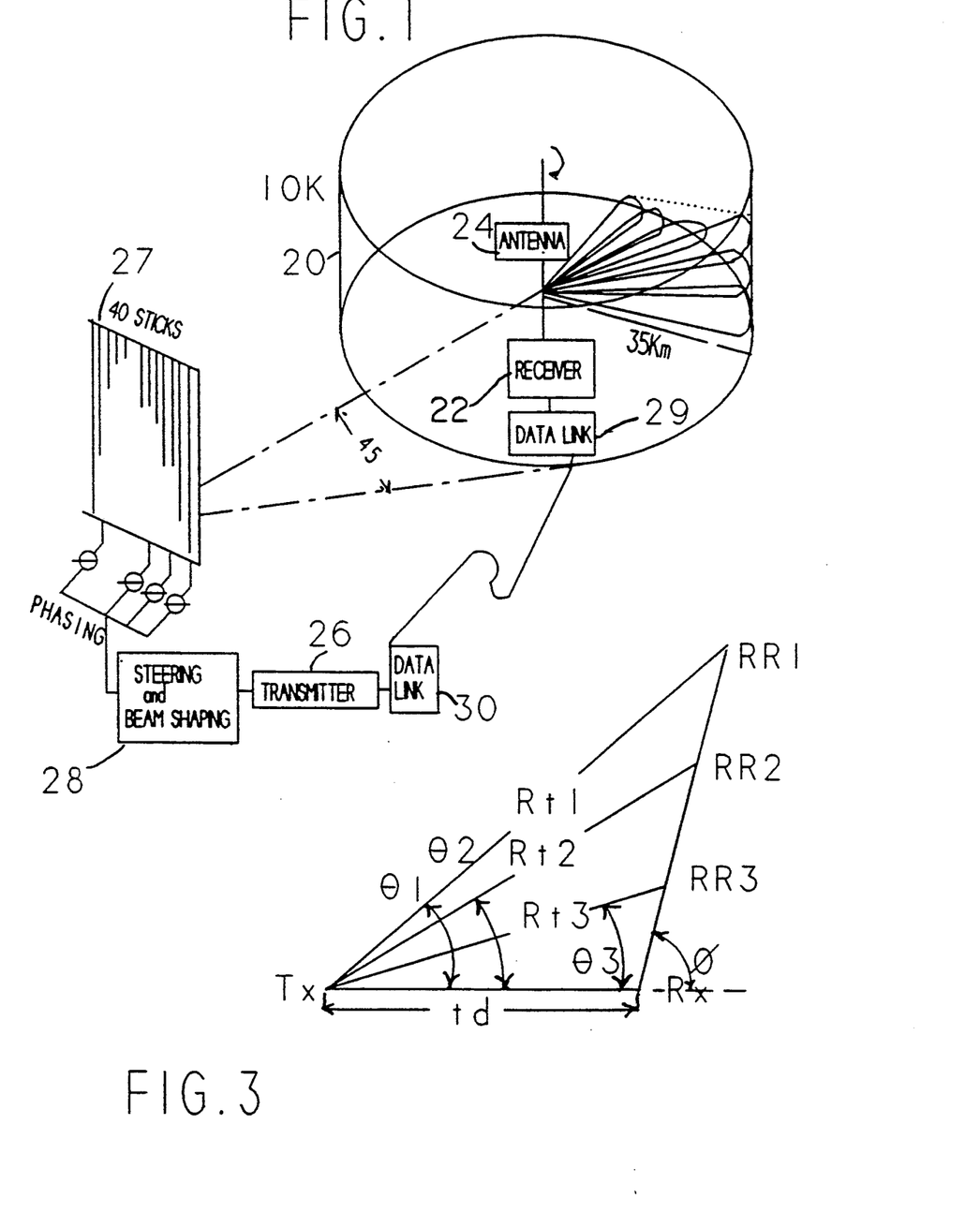
FIG. 1 is a schematic view partly in perspective of a polystatic radar system and the coverage area arranged in accordance with one embodiment of the present invention.
FIG. 3 is a diagram illustrating the radar geometry in azimuth for a bi-static system and method of the present invention.

In such an example, at least one receiver having a passive receiving antenna is disposed centrally of the coverage area and is scannable through a selected angle in azimuth, and with a suitable elevation beam shape for defining the coverage area. As shown in FIG. 1 radar receiver 22 is disposed within the coverage area 20. Receiver 22 may use a simple mechanical azimuth scan approach or a multiplicity of switched phased array antennas in the passive receive mode in the same manner as that used for monostatic operation. Receiver 22 has an antenna control means 24 and a data link receiver 29 which is described more in detail hereinafter.

In accordance with the present invention, at least one transmitter including an associated transmitting phased array antenna is disposed remote from the selected coverage area, the transmitter having transmit power for generating an adequately sensitive beam, but preferably with excess sensitivity at the maximum range of the coverage area. Referring to FIG. 1 and as embodied herein, a radar transmitter 26 having a phased array antenna 27 and a beam steering and shaping controller such as represented at 28 and a data link transmitter 30 is located remotely from receiver 22 and the coverage area 20. Referring to the example of FIG. 2, the distance of radar transmitter 26 from receiver 22 and the center of the coverage area 20 could be chosen as approximately 49.5 kilometers for scanning the transmit beam through an angle in azimuth 45° on both sides of the boresight to provide a coverage having a radius of approximately 35 kilometers. Although, it would appear from FIG. 2 that a simple floodlight illumination of the coverage area 20 would be the most economical approach, the required transmit power level would be practically prohibitive for a simple airborne (e.g., helicopter borne) transmitter. Assuming a 35 kilometer radius of the coverage area and at a ten kilometer altitude, the power level for a flood light application would be in the neighborhood of 18+ Kw as heretofore mentioned.

In accordance with the present invention, means are provided for dynamically shaping the transmitted beam of the at least one antenna and steering it through a selected angle for scanning the coverage area. The shaping means includes means for varying the effective width of the transmit beam and the illumination power density as a function of the angle within the transmitted beam or pattern or in other words as a function of the range to the receiver from each point within the receive beam coverage. The allowable variations are a function of the instantaneous beam geometry and hence change continuously as a function of the received beam scan angle.

The details of implementing the shaping and azimuth steering of the transmit beam of the phased array antenna may be accomplished according to the present invention by either a one-dimensional or two-dimensional phase shifter control of a phased array.

Referring to FIG. 3, consider the instantaneous beam geometry where the received beams (some form of stacked beam/ steerable beam configuration in elevation is assumed in order to provide elevation angle data and high angle track capability) are at a fairly large angle, $\phi$, with respect to the transmit/receive baseline. As shown in FIG. 3, conditions are illustrated for three different targets at ranges RR1, RR2, and RR3 from the receiver 22. The corresponding transmitter-to-target ranges are RT1, RT2, and RT3 respectively. In general, for a target at receive range $R_R$, and transmitter range RT, the signal-to-noise ratio (SNR) of the received signal is proportional to $$\frac{1}{R_R^2 R_T^2},$$

if all other factors are taken as constant. Ignoring possible variations in polystatic radar cross-section, the above result assumes that the transmitted power density per unit solid angle is maintained constant over the full range of transmit angles covering the instrumented receive range or coverage area. However, it is not necessary for the transmitted power density per unit solid angle to be constant over the full range of transmit angles for the coverage area.

As shown in FIG. 3, if a constant transmitted power density per unit solid angle is employed then the signal to noise ratio (SNR) generated by a given size cross-section target at ranges RR3, and RR2 are progressively greater than those at RR1, since $$\frac{1}{RR1^2 \cdot RT1^2} \text{ is lesser than}$$

$$\frac{1}{RR2^2 \cdot RT2^2} \text{ is lesser than } \frac{1}{RR3^2 \cdot RT3^2}.$$

Therefore, in order to provide equal detectability of a given size target independently of its receive range, the system and method of the present invention utilizes progressively lower transmit power densities per unit solid angle in the direction of targets at receive ranges RR2 and RR3, as compared with the power density used in the direction of the target at range RR1. This requires a transmit antenna that provides different gains in the azimuth directions angles $\theta 1$, $\theta 2$, and $\theta 3$. In general, the antenna gains will be progressively lower at $\theta 2$ and $\theta 3$, as compared with $\theta 1$ in the drawing. Nevertheless, for a given detection performance at maximum range $R_R{}^1$ and equal performance at all other shorter ranges, the total transmit power using the shaped transmit beam will be less than it would be using uniform or "floodlight" illumination. Equivalently, for a given receive range coverage, the gain of the transmit antenna beam in the direction of the longest target range is substantially higher than that of a uniform gain antenna covering the same total instrumented range or coverage area. Hence, a lower total transmit power level is required where it is desired to achieve performance at shorter ranges equal to that at the maximum range.

The "floodlight" illumination approach provides increased sensitivity of targets at less than the maximum range in the coverage area, whereas with the shaped beam of the present invention, such is not the case. This may be significant if there is a requirement to detect, at short range, targets of lower cross-section than is applicable at maximum range. However, the present invention assumes that constant detectability as a function of the received range is acceptable. The establishment of different performance levels as a function of range within the maximum range could also be possible within the scope of the invention.

Generally, with the shaped illumination beam approach of the present invention, the transmitter antenna beam shaping and steering requirements vary continuously as a function of the receive beam angle $\phi$. Specifically, for a target at the receive range RR1, the corresponding transmit angle is $$\theta = \tan^{-1}[R_R \sin\theta/(d + R_R \cos\theta)] \quad (1)$$

where d is the transmitter-to-receiver baseline length and the angles are measured relative to the baseline as shown in FIG. 3.

The range product $R_R R_T$ is then $$R_R \cdot R_T = d^2 \frac{\sin\theta}{\sin(\phi - \theta)} \left[ \cos\theta + \frac{\sin\theta}{\tan(\phi - \theta)} \right] \quad (2)$$

Constant sensitivity, independent of $R_R$ is accomplished when the transmit gain pattern, $G(\theta,\phi)$ satisfies the relationship $$G(\theta,\phi) = K(R_R^2 \cdot R_T^2) \text{ where K is constant.} \quad (3)$$

Figure 2:
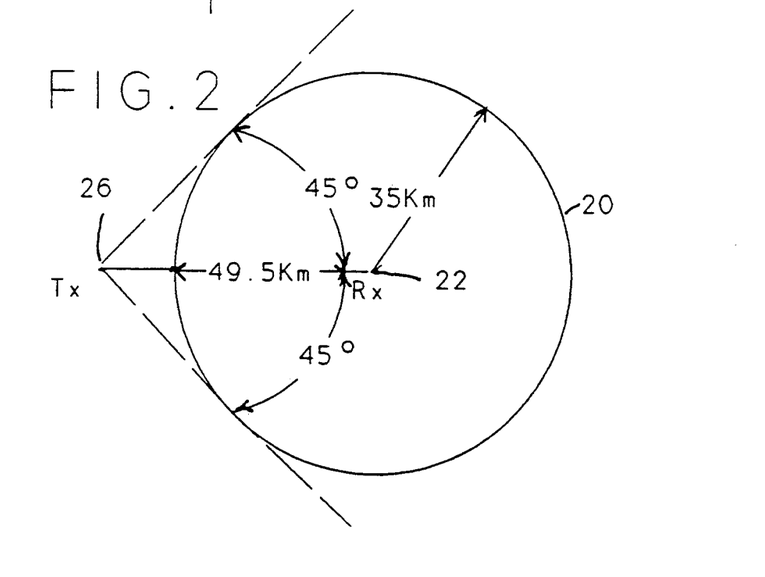
FIG. 2 is a diagram illustrating the possible location of the radar transmitter and receiver relative to the coverage area for a transmitter having a scan angle limit of 45° on either side of the boresight in accordance with an embodiment of the present invention.
Figure 4:
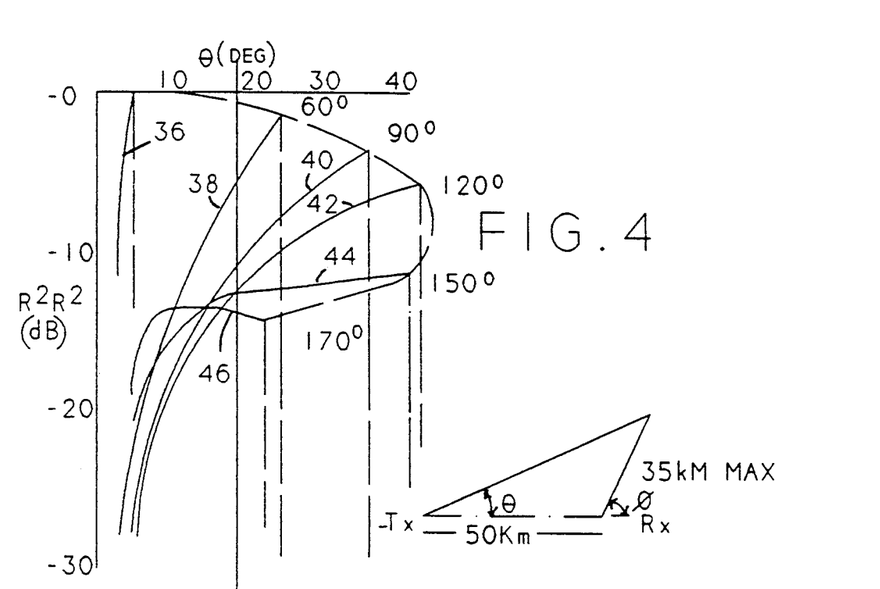
FIG. 4 is a diagram illustrating idealized transmitter beam shapes in azimuth in accordance with the system and method of the present invention.

Because of antenna design considerations, it may be considered undesirable to require beam steering beyond the limits of 45° relative to the bore sight of the antenna. Referring to FIG. 2, in order to provide the desired 35 kilometer range coverage, as indicated by perimeter 20, it is necessary to place the transmitter antenna at least 49.5 kilometers from receiver 24. Using this value for d of FIG. 2, equations (1)-(3) were solved for various values of $\phi$ and the results are shown in FIG. 4.

It is clear that not only does the required illumination coverage vary in azimuth as the received beams rotate, but it also varies in elevation in order to provide ten kilometer altitude coverage at all azimuths. For example, when the receive beams are pointed at angles $\phi$, whose magnitude is greater than 90°, the extent of the elevation angles that must be illuminated are greater than when the magnitude of $\phi$ is less than 90°. $\phi$ is defined as $-180° < \phi < 180°$. As shown in FIG. 4, the peak gains required for the larger values of $\phi$ such as 120° or 150°, for example, are less than those for the smaller values such as 60° or 90°. The beam shape of the transmittal beam is illustrated by line 36 when the receive beam is directed approximately 10° off the baseline and corresponds to a regular narrow beam of approximately proximately 3°, for example. When the transmit beam is approximately at an angle $\phi$ of 25° off the baseline and the receive beam is at a 60° angle $\phi$ as represented by line 38, the intensity of the required transmit beam as a function of angle varies by approximately 30 dB. At a 90° receive angle $\phi$ represented by line 40, the required beam intensity decreases from approximately $-4$ db to $-28$ dB. From 120° through 170° the shape of the beam, which is represented by lines 42, 44, and 46, has a pronounced shoulder wherein it extends from $-6$ dB to $-25$ dB for $\phi$ angle of 120°, $-11$ dB to $-20$ dB for 150° $\phi$ as represented by line 44, and from $-13$ dB to $-18$ dB for an angle $\phi$ of 170° as represented by line 46. It is this controlled decrease of gain on at least one side of the beam peak, sometimes referred to as a shoulder that permits the substantial decrease of transmit power of the system and method of the present invention.

Figure 5:
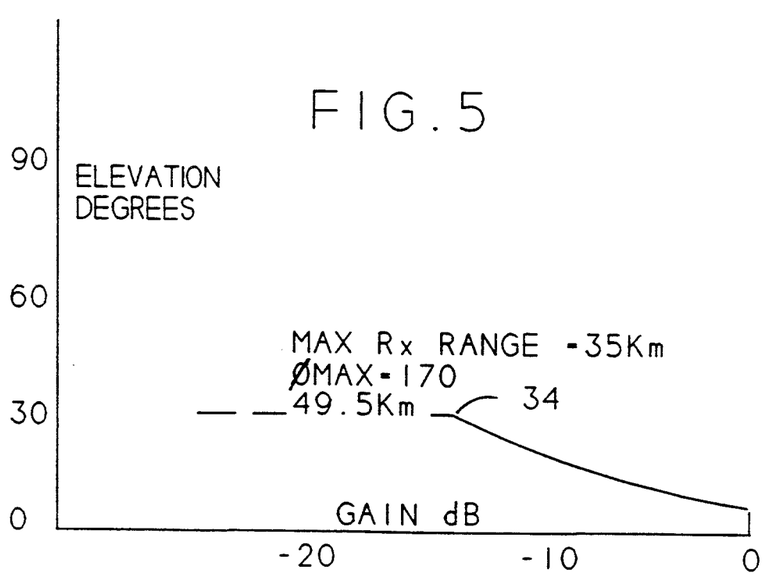
FIG. 5 is a diagram illustrating an example of the transmitter beam shape in elevation for a designated maximum range in accordance with the system and method of the present invention.

It is feasible to consider dynamic transmit beam shaping in elevation as well as in azimuth in order to maximize the available gain at smaller values of $\phi$. In contrast and to enable the use of a fixed elevation beam, the peak of the elevation beam may be designed to provide adequate uniform illumination over the ten kilometer altitude coverage extent for the worst cases corresponding to small values of $\phi$; that is, ±60°. Referring to FIG. 5, an upper elevation angle or "shoulder" referred to at 34 is added to provide sufficient illumination intensity at the higher elevation angles that must be illuminated for the larger values of $\phi$.

For any given value of $\phi$, the highest elevation angle, $\phi_m$, (as seen at the transmitter) that must be illuminated occurs at the maximum receive range of 35 Km. Its value is given by $$\sin\phi_m = h/R_m - R_m/2R_E \quad (4)$$

where $R_E$ is the effective earth's radius, $R_m$ is the range from the transmitter to the point of maximum receive range and h is the altitude extent of the required coverage. (h was taken to the 9.5 Km relative to the transmitter, that was assumed to be operating on an elevated platform at 0.5 Km altitude). $R_m$ is given by:

$$R_m^2 = d^2 + R_{RM}^2 - 2dR_{RM}\cos\phi + h^2 \quad (5)$$

where $R_{RM}$, the maximum receive range, is 35 Km, in the described example

In accordance with the present invention, the transmitter has transmit power for generating a narrow beam with excessive sensitivity at maximum range of the coverage area, for $\theta = 0°$. The value of the gain required at each value of the maximum transmit angle $\phi_m$ is the peak gain required at the corresponding value of $\theta$ as determined from FIG. 4. The resulting transmit antenna elevation pattern is that shown in FIG. 5.

Figure 7:
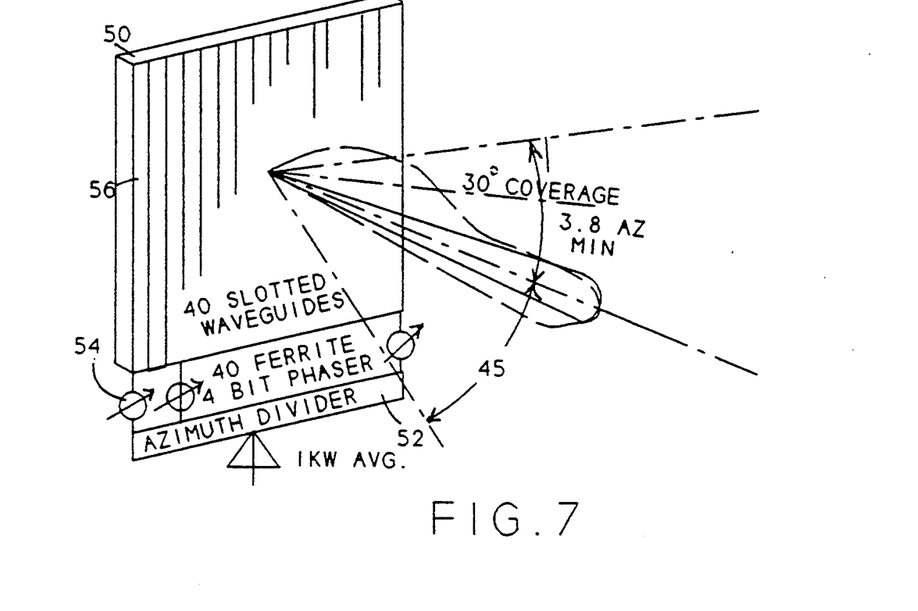
FIG. 7 shows the transmit antenna configuration to achieve beam shaping and steering of the present invention.

An array antenna functions as the transmit end of a polystatic radar. As the receive antenna rotates to search a cylindrical volume, the transmitter outside the cylinder must scan electronically to illuminate the changing receiver sector. This requires both scanning and beam shaping. An antenna as shown in FIG. 7 was designed and the required beams were synthesized using phase shift only. Results indicated good efficiency and coverage with this system.

FIG. 1 shows the exemplary scenario. In this example, the transmitter has been placed 14.5 km behind the receive coverage 20 so that the maximum transmit scan angle is ±45°. The coverage has a 35 km radius and 10.1 km altitude. The elevation coverage is constant enough that a fixed pattern can cover it with reasonable efficiency.

Referring to the embodiment of FIG. 7, the means for achieving beam shaping and steering includes a rectangular array of vertical waveguide sticks 50 fed by a waveguide azimuth divider 52 and simple ferrite phase shifters which was utilized in practicing the invention. Sticks 50 must be near-vertical or they will scan in a cone. For low cost, a slotted array is highly desirable, and the shaped elevation beam makes a travelling wave array preferable. An x-band operating frequency (9.5 to 9.7 GHz) was selected.

For reasonable elevation shaping without grating lobes a 15" stick length having twenty-four slots 56 spaced 0.625 inches apart was selected. The critical gain region is at a 60° to 90° receive scan where the coverage has widened but the peak range has not fallen off significantly. The array was designed for best efficiency in that condition. This results in a 25 inch width. To avoid grating lobes the stick spacing is less than $\lambda/(1+\sin 45)=0.7"$, and 40 sticks spaced 0.625" apart were chosen. Although sidelobes are not critical, phase shifters 54 should have 4 bits to keep the quantization loss less than 0.1 dB. Latching toroidal ferrite phasers are available with about 1 dB loss in 4 bits.

Figure 8:
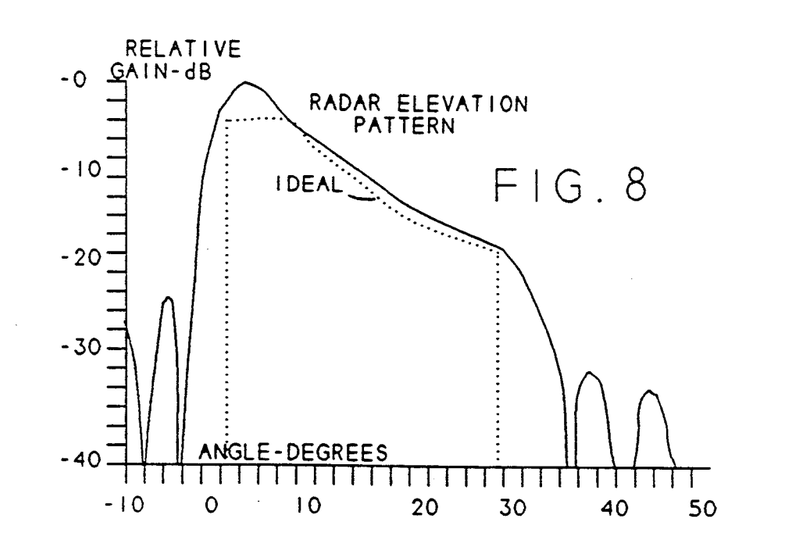
FIG. 8 shows an example of a transmit antenna beam pattern in elevation.

Referring to FIG. 8, the elevation pattern was synthesized using a z-parameter method. Coverage is good and the efficiency is −3.05 dB. Referring to FIGS. 9A through 9E, the azimuth patterns require a phase-only synthesis. The equivalent of an optical approximation was used successfully. Starting at one end of the receive coverage an increment (d) of azimuth (AZ) is taken and the power required P(AZ) is found from FIG. 4. Starting at one end of the array A with an assumed voltage distribution A(y), increments of width (dy) are taken until their total power equals that required in that sector. The phase slope across that piece of array is set to aim the energy at that azimuth of the sector.

$$\frac{d\phi}{dy} = \frac{2\pi}{\lambda} \sin (AZ) \quad (6)$$

From that sector on, azimuth increments are continued and Y was chosen sufficient to equalize the powers. Thus $$\int_o^Y A^2(y)dy = \int_o^{AZ} P(AZ)d\,AZ \quad (7)$$

The phases across the array are found by integrating equation (6)

$$\phi(y) = \frac{2\pi}{\lambda} \int_o^Y \sin(AZ)dy \quad (8)$$

With minor modifications this was used to derive the patterns.

Figure 9A:
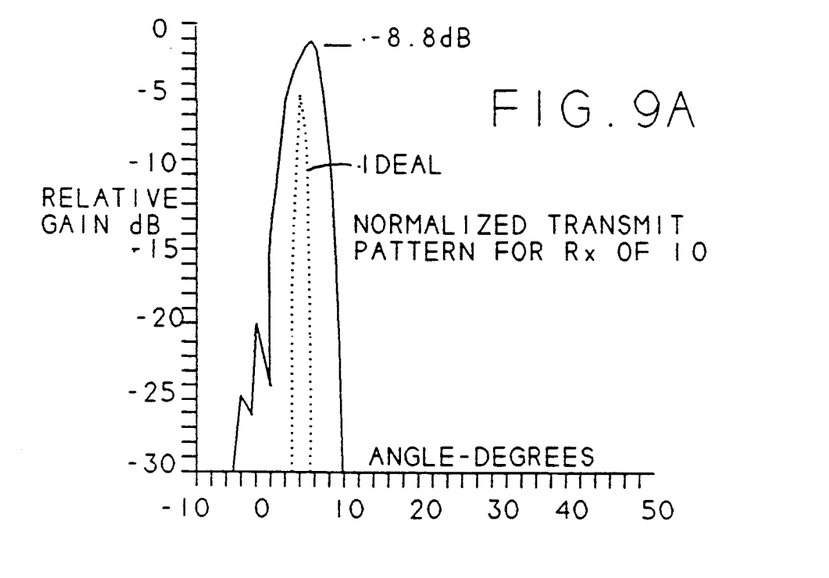
FIGS. 9A through 9E show exemplary transmit antenna beam patterns in azimuth in accordance with the present invention.
Figure 9B:
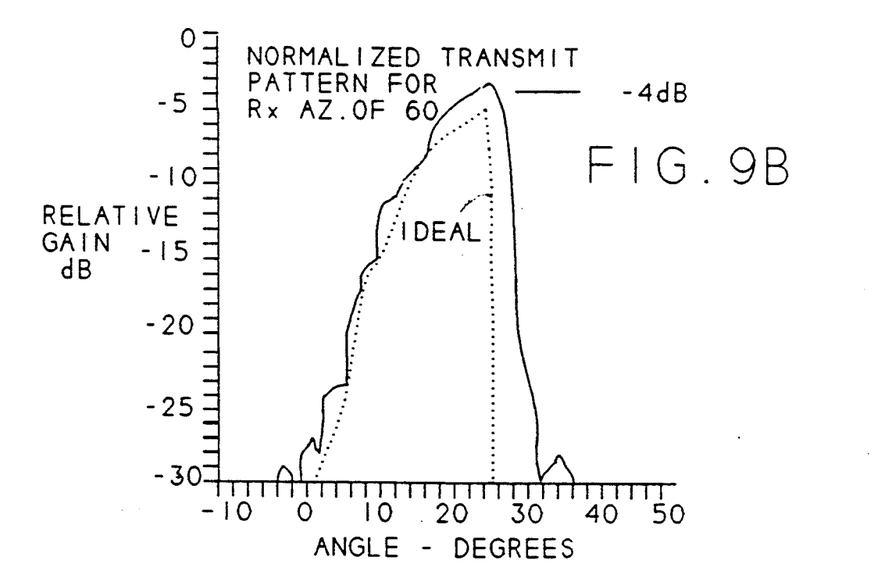
Figure 9C:
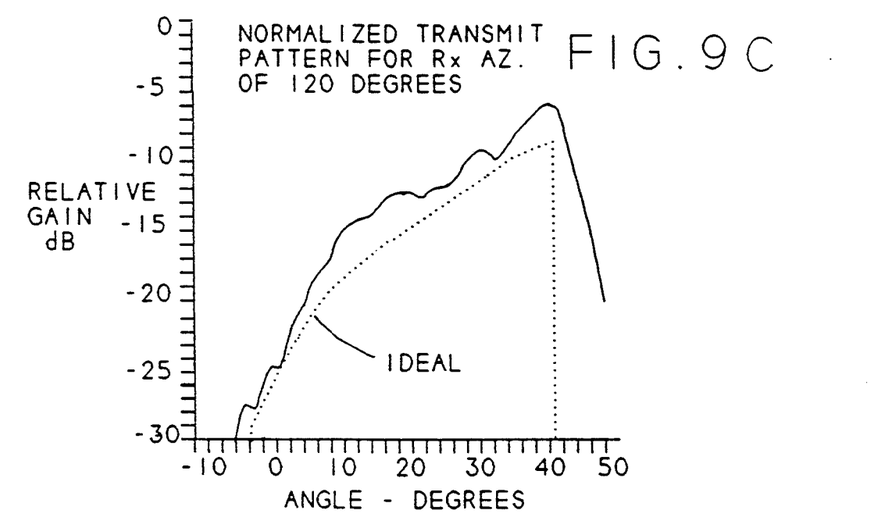
Figure 9D:
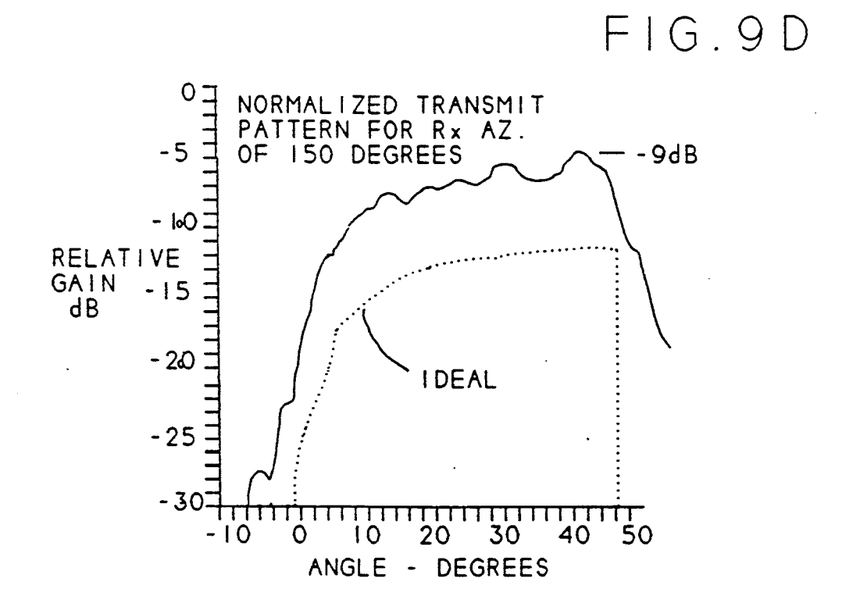
Figure 9E:
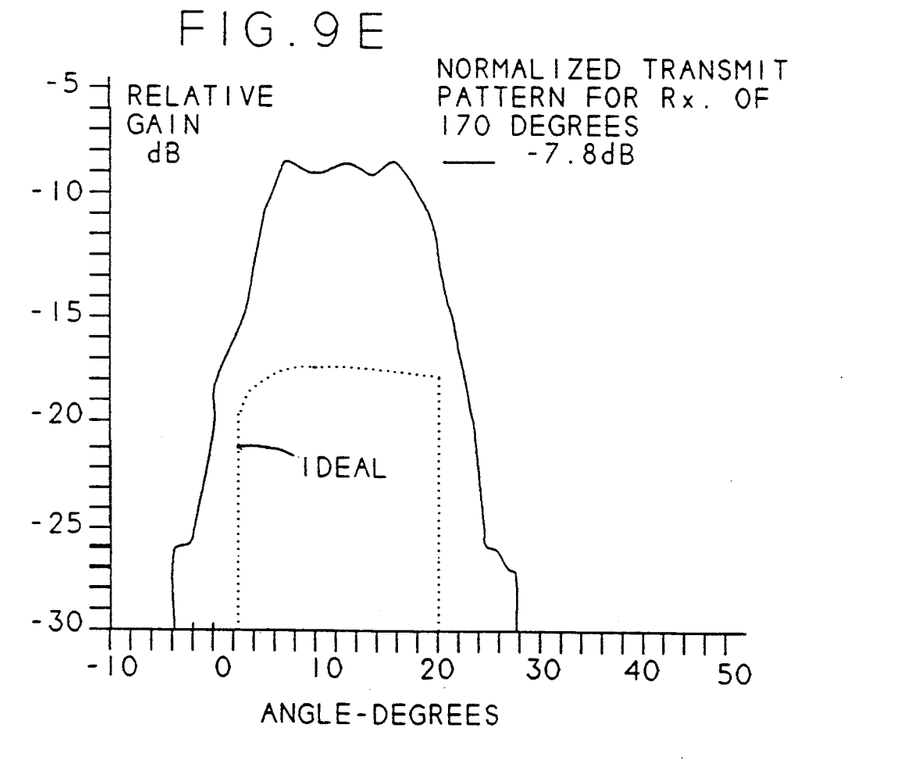

The choice of amplitude taper is a trade-off between peak gain and ripple. For the near 0° case such as shown in FIG. 9A, a uniform illumination would provide peak gain. For the more critical 60° to 90° cases, see FIG. 9B such a taper causes ripples in the synthesized pattern due to diffraction of the stepped edge taper. The optimum appears to be a cosine taper on a −10 dB plateau.

As shown by the full set of the synthesized patterns in FIGS. 9A through 9E, the coverage is good, indicating that phase-only shaping is adequate.

The following is a table indicating the achievable antenna gains and resulting sensitivities.

| Receive Azimuth | ±10° | ±60° | ±90° | ±120° | ±150° | ±170° |
|---|---|---|---|---|---|---|
| Available Gain $4/\lambda^2$ (dB) | 35.8 | | | | | |
| Elevation efficiency (dB) | −3.05 | | | | | |
| Azimuth efficiency (dB) | −0.6 | −4.0 | −5.7 | −7.0 | −9.0 | −7.8 |
| Directivity | 32.15 | 28.75 | 27.05 | 25.75 | 23.75 | 24.95 |
| Losses: | | | | | | |
| Load | −.2 | | | | | |
| Radome and Face | −.4 | | | | | |
| Sticks | −.2 | | | | | |
| Phasers | −1.0 | | | | | |
| Divider | −.8 | | | | | |
| Waveguide (misc.) | −.4 | | | | | |
| Total | −3.0 | | | | | |
| Peak Gain | 29.15 | 25.75 | 24.05 | 22.75 | 20.75 | 21.95 |
| Allowance for Fit - Elev. | −2.5 | | | | | |
| Allowance for Fit - Az. | −0.0 | −1.5 | −1.1 | −1.5 | −4.0 | −3.7 |
| Usable Gain | 26.65 | 21.75 | 20.45 | 18.75 | 14.25 | 15.75 |
| $R_R^2 R_T^2$ Improvement (dB) | 0.0 | 1.2 | 2.9 | 5.6 | 10.2 | 14.3 |
| Net | 26.65 | 22.95 | 23.35 | 24.35 | 24.45 | 30.05 |

At maximum range, that is, where the angle $\theta$ is zero there is a sensitivity margin of 3.7 dB, even though the minimum beamwidth is held to approximately 3°. This margin may be utilized to modify the transmit beam shape by adding lower level shoulders to provide illumination coverage for receivers located adjacent to the receiver to which the illumination is primarily directed. The shoulder level is set at a value that will reduce the peak gain by the extent of the otherwise available sensitivity margin. Usable gain is defined herein as maximum available gain at the beam peak when the pattern equals or exceeds the requirements at all angles.

The worst case with respect to the maximum required transmitter power occurs at a receive antenna beam angle $\phi$ of approximately 60°. The actual power required for this worst case was computed on the basis of a two second search data rate. Using a high prf (50 kilohertz) mode, with two bursts per beamwidth in order to accomplish range ambiguity removal. A detection criterion of $P_d=0.5$ and $P_{fa}=10^{-6}$ for a 1 m$^2$ swl target was used. The required integrated SNR of 12.6 dB was increased to 13.6 dB to provide for detection on both bursts in the beamwidth on the assumption that there is no rf frequency change between bursts and hence no burst-to-burst target fluctuation. The corresponding required SNR per pulse is, therefore, $13.6 - 10 \log_{10} 250 = -10.4$ dB, or in other words a power ratio of 0.0912. The transmit gain was taken at 21.75 dB (150 power ratio) as indicated above. The receiver gain was assumed to be that of a typical radar antenna, namely 38 dB (6310 power ratio). X-band operation (0.03 m wavelength) was assumed. A total of eight dB (6.3 power ratio) of losses were allowed together with an effective noise temperature of 461° K. The receive range was taken as 35 kilometers and the transmit range as 74 kilometers corresponding to the worst case receiving beam angle of 60° and a 50 kilometer transmit/receive spacing.

The required average transmit power was calculated from the relationship:

$$P = \frac{(4\pi)^3 R_1^2 R_2^2 KT_s BL V_{of}}{G_T G_R \lambda^2 \sigma} \quad (9)$$

Hence, using the parameters given above:

$$\frac{(4\pi)3 \times 742 \times 352 \times 1012 \times 1.38 \times 10 - 23 \times 461 \times 5 \times 410 \times 6.3 \times 0.0912}{6310 \times 150 \times 0.03^2 \times 1} = \quad (10)$$

2,856 W. or approximately 02.9 Kw.

By contrast, the required transmit power for floodlight illumination is approximately 18.7 kilowatt average for the same coverage area. By comparison with the peak gain (26.65 dB) of the phase shifter controlled antenna that provides a 3° beamwidth, the gain reduction factor for this degree of beam broadening would be 10 log (72/3)=13.8 dB.

Figure 6:
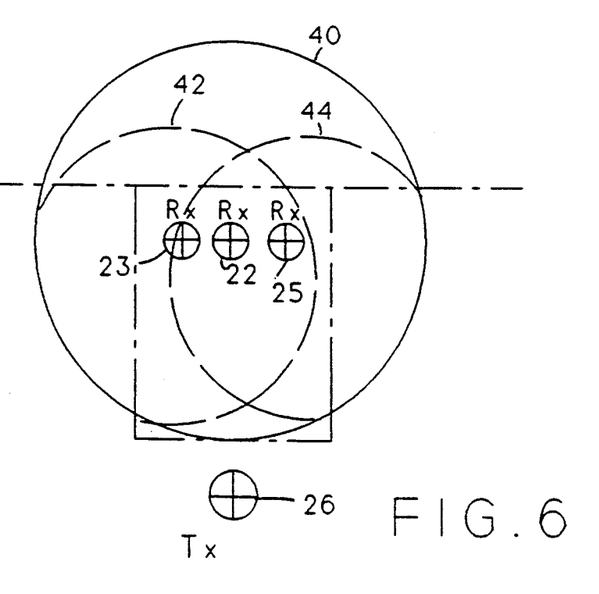
FIG. 6 is a diagram illustrating polystatic radar coverage patterns provided by three receivers and a single transmitter in accordance with the system and method of the present invention.

The system and method of the present invention may employ more than one passive radar receiver or more than one remotely located transmitter. Referring to FIG. 6, a single transmitter 26 is remotely located from receivers 23, 22 and 25. Central receiver 22 has coverage corresponding to solid circular line 40 while receivers 23 and 25 provide coverage corresponding to dashed circles 42 and 44 respectively. The transmit antenna beam shapes of the present invention for small receive antenna beam angles; such as 10°, for example, are quite narrow in the neighborhood of 3°. Such a beam directed appropriately for one of the radar receivers shown in FIG. 6 would provide no useful illumination for the other two. However, it can be noted from the table set forth herein that the 3° transmit beam has an excess gain of 3.7 dB as compared with the worst case of 60° received beam scan angle. This excess peak gain may be traded for a broad, low level, add-on shoulder pattern in azimuth for providing useful illumination for polystatic receivers adjacent to the one for which the transmit beam steering and shaping is optimized. Assuming that this optimization is made for the center receiver of the three providing bistatic coverage in FIG. 6, and taking the receiver spacing to be at approximately 12.5 kilometer intervals, the desired angular extent of the shoulder coverage is approximately ± tangent$^{-1}$(12.5/85)=±8.4°, or a total extra width of 16.8°. This excess available gain of 3.7 dB is equivalent to a power ratio of 2.34, hence, the total power that can be devoted to the shoulder pattern is the fraction (2.34−1)/2.34=0.57 of the total. Thus, if the shoulder pattern width were the same as the main beam, the shoulder gain would be 0.57/(1−0.57)=1.33×(1.2 db) greater than the main beam. However, since the shoulder width is 2×8.4/3=5.6×(7.5 dB) greater than the main beam, the shoulder gain would be 7.5−1.2=6.3 dB less than that of the main beam. The corresponding range reduction factor for the shoulder-illuminated receiver is, therefore, approximately 3.15 dB or a factor of 0.48, since the transmit range is approximately the same for both receivers, the received SNR, therefore, varies as $1/R_R^2$ where $R_R$ is the received range. This shoulder-illumination transmit process for small values of received beam scan angle and with other unmodified transmit beam shapes at larger receive beam angle, for example, 60° and above, results in the composite polystatic coverage patterns as shown in FIG. 6 for a single transmitter. Clearly, the overlap coverage of the outer receivers 23 and 25 has been reduced but note that shorter range coverage, for low altitude targets that are masked from all but one of the receivers, is maintained. Thus, a single illuminator provides a major part of the useful performance of all three bistatic receivers.

The system and method of the present invention include synchronizing the scanning of the receiver antenna and the steering and shaping of the illuminating beam. Three aspects of transmitter/receiver synchronization are involved. First, there is the coherence necessary to hold phase and time jitter to acceptable levels so that ground clutter falls within the moving target indicator (MTI) canceller notch, and A/D timing jitter from pulse repetition time (prt) to (prt) is adequately low in each range cell of the coverage. Secondly, there is achievement of the proper zero range timing reference necessary to permit correct association of each range cell with true range. Third, there is synchronization of receive beam rotation necessary with the time varying transmit antenna beam steering and shaping pattern.

Various well known methods for achieving the required synchronization capability could be employed. One way in which such synchronization may be accomplished is, for example, by the addition of an L-Band link between the transmitter and receiver, as a means of providing the coherent reference as shown in FIG. 1 by data link transmitter 29 and data link receiver 30. With this procedure, a well-known master crystal oscillator in the transmitter would be the source of all rf, prf, and timing signals within the transmitter and would also generate the signal for the L-Band link in a well-known manner. Hence, the successful reception at the receiver would permit reconstruction of all necessary local oscillator and prf signals. The effective SNR must be adequate to permit this to be accomplished with the necessary degree of phase stability. An effective SNR of 60 dB is required to achieve phase stability corresponding to the assumed 60 dB requirement. The L-Band link could use simple horn antennas for both transmit and receive for which it is assumed is a 15 dB gain. A transmit power level of approximately 100 watts could be used, for example.

Readily achievable long-term frequency accuracy for the master crystal oscillator results in a projected uncertainty bandwidth of 50 kHz at L-Band. This therefore represents the required RF bandwidth of the L-Band receiver. However, once the signal is acquired a narrow band phase locked loop can be locked to it and we have assumed a 50 hertz loop bandwidth. This bandwidth reduction improved the effective SNR of the phase locked loop output by 30 dB with respect to that of the RF signal input. Calculation of the expected RF SNR is provided as follows:

The received power level for a microwave link is $$P = P + G + GR = L - F - L_R \quad (11)$$

where $P_T$ is the transmit power level, $G_T$ and $G_R$ are the transmit and receive antenna gains respectively (each 15 dB), $L_R$ is receiver loss, assumed to be 10 dB, and L is the path loss, given by $$L \text{ (dB)} = 32.4 + 20 \log_{10} D + 20 \log_{10} f \quad (12)$$

where D is the path length in Km and f is the frequency in MHz. F is an allowable fade margin, which we have assumed to be 38 db on the basis of worst-case Rayleigh fading for an availability of 99.99% for this link.

Thus, $$L = 32.4 + 20 \log_{10} 50 + 20 \log_{10} 1300 \quad (13)$$
$$= 128.7 \text{ db}$$

and $$P = 20 + 15 + 15 - 128.7 - 38 - 10 \quad (14)$$
$$= 126.7 \text{ dBw}$$

For the assumed RF bandwidth of 50 kHz, the thermal noise level is $$N = -204 + 47 \quad (15)$$
$$= -157 \text{ dBw}$$

The received SNR at rf is, therefore, $$SNR_{rf} = -125.7 + 157 \quad (16)$$
$$= 30.3 \text{ db}$$

This is the minimum, under the assumed worst fading conditions.

The noise reduction provided by the receiver phase-lock loop then improves the effective SNR to 60.3 dB.

Thus, the suggested L-band link provides a signal of adequate stability. It can be implemented with a relatively modest amount of extra hardware.

A further potential advantage of the L-band link is that it can also provide a communication capability to the receivers by use of superimposed phase modulation of the coherent reference signal. This can provide a number of useful functions, such as coded information describing upcoming rf illumination frequency changes, for frequency agile mode operation, and also data for receive beam scan rotation synchronization.

Note, however, that assuming the illuminator is designated the master for receive beam scan rotation synchronization, the X-band illumination varies cyclically at the required receiver scan rate, and can itself be used to synchronize the receiver scan as an alternative to control via the communication link. In either case it is assumed that the receiver is provided with a controlled position servo drive. The latter can readily be mechanized using a reliable induction drive motor, powered by a solid-state frequency and voltage controlled drive amplifier.

It remains to show that the X-band illumination signal can provide the necessary timing signal for identification of zero range.

As a function of the illumination antenna beam shaping/scanning pattern, the minimum transmit gain in the receiver direction is −3 db. We have assumed that the receiver would be provided with an auxiliary X-band horn antenna of 15 dB gain, pointed in the transmitter direction.

We have also assumed an illumination signal bandwidth of 5 MHz corresponding to expected range resolution requirement. Waveform choice is not critical, for this purpose, but assuming phase modulated CW at 50 kHz prf, the power level would be 2.9 Kw (34.6 dBw), and the pulse compression ratio would be 100.

Receive losses are assumed to be 10 dB total. Choice of a suitable fade margin is somewhat subjective, but since failure to receive the timing signal impacts detection probability primarily, rather than false alarm rate, it is assumed that an availability of 99.9% is adequate, for which the corresponding fade margin for worst-case Rayleigh fading is 28 dB.

Thus, from equation 12, $$L = 32.4 + 20 \log 10\, 50 + 20 \log_{10} 10^4 \quad (17)$$
$$= 146.4 \text{ dB}$$

For this application, equation 11 must be modified by adding the coherent integration gain (20 dB) to the right hand side. Hence, $$P = 34.6 - 3 + 15 - 146.4 - 28 - 10 + 20 \quad (18)$$
$$= 117.8 \text{ dBw}$$

For the 5 Mhz (67 dBHz) bandwidth, the thermal noise level is $$N = -204 + 67 \quad (19)$$
$$= -137 \text{ dBw}$$

Hence the SNR is $-117.8 + 137 = 19.2$ dB, minimum, under the worst assumed fading conditions.

In terms of detecting the direct signal, after pulse compression, in order to establish $t_o$, the zero-range reference time, the above SNR is sufficient to provide essentially 100% detectability at a false alarm rate of $10^{-6}$, and would be adequate.

Note that it is not proposed to use the $t_o$ signal derived in this way to establish precise A/D converter timing. The X-band SNR would not be adequately stable for that purpose. Instead, the L-band reference would be used to establish the A/D converter sampling rate. The X-band signal would be used merely to identify which range cell corresponds to zero range.

An alternative approach to the combined L-band/X-band reference link arrangement described above would be to provide precise atomic clocks at all transmitter and receiver locations, as long-term frequency references, and to lock local crystal controlled oscillators to them, in order to generate frequency references with adequate short term stabilities. Long term frequency stabilities in the order of 1 hertz or better would be achievable.

It will be apparent to those skilled in the art that various modifications and variations can be made in the polystatic radar system and method of the present invention without departing from the scope or spirit of the invention. As an example, there can be more than one transmitter as well as more than one receiver. Further, the passive receivers may have a phased array antenna as well as a mechanical scanning antenna, for example. Thus, it is intended that the present invention cover the modifications and variations of this invention provided they come within the scope of the appended claims and their equivalents.

What is claimed is:

1. A polystatic radar system for detecting targets in a selected coverage area, comprising:
   at least one transmitter including an associated transmitting phased array antenna for disposition remote from the selected coverage areas, the transmitter having adequate transmit power for detecting a specified target at maximum range of the coverage area;

at least one receiver including an associated passive antenna disposed for detecting targets in the coverage area; and means including the antenna for shaping and steering the transmitted beam of a selected angle for scanning the coverage area, the shaping and steering means including means for varying the illumination power density as a function of the range to the receiver from each point within the receive beam coverage; and means for synchronizing the transmitted beam with the receiving antenna.

2. The system of claim 1 wherein the associated antenna comprises an array of adjoining vertical woveguide sticks each having a multiplicity of waveguide slots spaced a predetermined distance from one another; a waveguide azimuth divider; and a phase shifter for each of said sticks connected to the array.

3. The system of claim 2 wherein the means for varying the illumination power density includes the application of power to the array in increments across the sticks of the array corresponding to predetermined increments in azimuth of a predetermined receive sector, and the total applied power to the array corresponds to the power for said predetermined sector.

4. The system of claim 3 wherein means for varying the illumination power density includes means for limiting the variable illumination as a function of the instantaneous beam geometry which changes continuously as a function of the received beam scan angle.

5. The system of claim 3 wherein the beam shaping and steering means includes means for controlling the decrease of gain on at least one side of the peak to a value that maintains adequate receiver sensitivity for illuminating an area covered by the two or more receivers.

6. A method of operating a polystatic radar system for detecting targets in a selected coverage area, comprising:

positioning at least one receiver with an associated receiving antenna within the receive area to be covered;

pointing the receiving antenna receiving beams through a selected range of angles for defining the receive coverage;

positioning at least one transmitter with an associated phased array antenna remote from the receive coverage;

generating a transmit beam;

steering the transmit beam through a selected range of angles in azimuth;

varying the width of the beam as a function of steering angle and the illumination power density as a function of the range to the receiver from each point within the receive beam coverage; and synchronizing the transmitted beam and the receiving antenna.

7. The method of claim 6 wherein the steps of varying the illumination comprises lowering the transmit power densities per unit solid angle from maximum to minimum receive range in the coverage area.

8. The method of claim 7 wherein the step of varying the width and power density includes the substep of applying power the columns of the phased array antenna at phase increments that steer segments of the array to predetermined increments in azimuth of a predetermined sector in the receive coverage; and limiting the total power applied to the array corresponding to the total power required for said predetermined sector.

9. The method of claim 7 wherein segments of the array are phased to aim the energy at regions of azimuth within the sector in accordance with the following equation $$\frac{d\phi}{dy} = \frac{2\pi}{\lambda} \sin (AZ) \qquad (6)$$

where $d\phi$ is an increment in azimuth and dy is an increment of width.

10. The method of claim 7 wherein the step of aiming varying segments of the array aperture to specific azimuth sectors includes varying the phase in azimuth increments in accordance with the following:

$$\int_o^y A^2(y)dy = \int_o^{AZ} P(AZ)d\,AZ \qquad (7)$$

and integrate equation (6) to obtain the following:

$$\phi(y) = \frac{2\pi}{\lambda} \int_o^Y \sin(AZ)dy \qquad (8)$$

wherein A(y) is the array voltage distribution; d AZ is the increment in azimuth; P is power; AZ is azimuth; and Y is the width of the voltage distribution.

11. The method of claim 7 wherein the step of varying the illumination comprises controllably decreasing gain on at least one side of the beam peak.

12. The method of claim 6 wherein the step of varying the illumination includes varying the power density continuously as a function of the receive beam scan angle.

13. The method of claim 6 wherein the step of steering the beam comprises scanning the transmit beam through a predetermined angle in azimuth from the antenna boresight of the transmitting antenna corresponding to the geometry of the transmit/receive system and the desired coverage.

14. The method of claim 6 wherein the step of positioning the at least one receiver and its associated antenna comprises positioning a plurality of receivers spaced from one another in the coverage area; the step of generating the transmit beam includes generating a beam with adequate sensitivity at the maximum range in the coverage area, and controlling the decrease of gain on at least, one side of the peak to maintain adequate sensitivity for target detection at all receive ranges within the receive coverage.

* * * * *